United States Patent
Nanda et al.

(10) Patent No.: US 11,394,020 B2
(45) Date of Patent: Jul. 19, 2022

(54) EARLY TRANSITION METAL STABILIZED HIGH CAPACITY COBALT FREE CATHODES FOR LITHIUM-ION BATTERIES

(71) Applicant: UT-BATTELLE, LLC, Oak Ridge, TN (US)

(72) Inventors: Jagjit Nanda, Knoxville, TN (US); Ilias Belharouak, Knoxville, TN (US); Ethan C. Self, Oak Ridge, TN (US); Devendrasinh Udaisinh Darbar, Cookeville, TN (US)

(73) Assignee: UT-BATTELLE, LLC, Oakridge, TN (US)

( * ) Notice: Subject to any disclaimer, the term of this patent is extended or adjusted under 35 U.S.C. 154(b) by 249 days.

(21) Appl. No.: 16/448,169

(22) Filed: Jun. 21, 2019

(65) Prior Publication Data

US 2020/0403216 A1    Dec. 24, 2020

(51) Int. Cl.

| | |
|---|---|
| *H01M 4/131* | (2010.01) |
| *H01M 4/04* | (2006.01) |
| *H01M 4/1391* | (2010.01) |
| *H01M 4/36* | (2006.01) |
| *H01M 4/505* | (2010.01) |
| *H01M 4/525* | (2010.01) |
| *H01M 4/62* | (2006.01) |

(Continued)

(52) U.S. Cl.
CPC ......... *H01M 4/131* (2013.01); *H01M 4/0404* (2013.01); *H01M 4/1391* (2013.01); *H01M 4/366* (2013.01); *H01M 4/505* (2013.01); *H01M 4/525* (2013.01); *H01M 4/625* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| 2008/0118829 A1* | 5/2008 | Nanno | H01M 4/525 429/163 |
|---|---|---|---|
| 2012/0231334 A1* | 9/2012 | Kinoshita | B82Y 30/00 429/211 |

(Continued)

OTHER PUBLICATIONS

Wang et al., High-performance, low-cobalt cathode materials for lithium-ion batteries, Jun. 11, 2019, publicly available via Internet: Energy.gov https://www.energy.gov > eere > vehicles > downloads (Year: 2019).*

(Continued)

*Primary Examiner* — Zhongqing Wei
(74) *Attorney, Agent, or Firm* — Fox Rothschild LLP

(57) ABSTRACT

A cathode for a lithium battery includes $LiNi_{0.5-x/2}Mn_{0.5-x/2}M_xO_2$ where M is at least one selected from the group consisting of Mo, Ti, Cr, Zr and V, and x is between 0.005-0.02. The $LiNi_{0.5-x/2}Mn_{0.5-x/2}M_xO_2$ can be coated with $Mn_2P_2O_7$. The $Mn_2P_2O_7$ can be 1-3 wt. %, based on the total weight of the $LiNi_{0.5-x/2}Mn_{0.5-x/2}M_xO_2$ and $Mn_2P_2O_7$. A cathode composition, a lithium battery, and a method of making a lithium battery are also disclosed.

23 Claims, 19 Drawing Sheets

(51) Int. Cl.
    H01M 10/0525      (2010.01)
    H01M 4/02         (2006.01)

(56) References Cited

U.S. PATENT DOCUMENTS

2016/0301069 A1* 10/2016 Kwak ............... H01M 4/1391
2017/0187065 A1*  6/2017 Inoue .................... H01M 4/62

OTHER PUBLICATIONS

Ruther, R. E et al.: "Synthesis, Structure, and Electrochemical Performance of High Capacity Li2Cu0.5Ni0.5O2 Cathodes", Chemistry of Materials 2015, 27, (19), 6746-6754.

Sathiya, M. et al.: "Reversible anionic redox chemistry in high-capacity layered-oxide electrodes", Nature Materials 2013, 12, (9), 827-35.

Ruther, R. E. et al.: "Structural Transformations in High-Capacity Li2Cu0.5Ni0.5O2 Cathodes", Chemistry of Materials 2017, 29, 2997-3005.

Nitta, N. et al.: "Li-ion battery materials: present and future", Materials Today 2015, 18, (5), 252-264.

Radin, M. D. et al.: "Narrowing the Gap between Theoretical and Practical Capacities in Li-Ion Layered Oxide Cathode Materials", Advanced Energy Materials 2017, 7, (20), 1602888.

Etacheri, V. et al.: "Challenges in the development of advanced Li-ion batteries: a review", Energy & Environmental Science 2011, 4, (9), 3243.

Thackeray, M. et al.: "Li2MnO3-stabilized LiMO2 (M = Mn, Ni, Co) electrodes for lithium-ion batteries", Journal of Materials Chemistry 2007, 17, (30), 3112.

Wu, Y. et al.: "High Capacity, Surface-Modified Layered Li[Li(1?x)/3Mn(2?x)/3Nix/3Cox/3]O2 Cathodes with Low Irreversible Capacity Loss", Electrochemical and Solid-State Letters 2006, 9, (5), A221.

Kim, S et al.: "Material design of high-capacity Li-rich layered-oxide electrodes: Li2MnO3 and beyond", Energy & Environmental Science 2017, 10, (10), 2201-2211.

Li, Y. et al.: "Unexpected Voltage Fade in LMR-NMC Oxides Cycled below the "Activation" Plateau", Journal of the Electrochemical Society 2014, 162, (1), A155-A161.

Gallagher, K. G. et al.: "Correlating hysteresis and voltage fade in lithium- and manganese-rich layered transition-metal oxide electrodes", Electrochemistry Communications 2013, 33, 96-98.

Croy, J. R. et al.: "Examining Hysteresis in Composite xLi2MnO3-(1-x)LiMO2 Cathode Structures", The Journal of Physical Chemistry C 2013, 117, (13), 6525-6536.

Lee, E. et al.: "Structural and Chemical Evolution of the Layered Li-Excess LixMnO3 as a Function of Li Content from First-Principles Calculations", Advanced Energy Materials 2014, 4, (15), 1400498.

Ma, J. ert al.: "Feasibility of Using Li2MoO3 in Constructing Li-Rich High Energy Density Cathode Materials", Chemistry of Materials 2014, 26, (10), 3256-3262.

Ma, J. et al.: Structural and electrochemical stability of Li-rich layer structured Li2MoO3 in air Journal of Power Sources 2014, 258, 314-320.

Park, K.-S. et al.: "LiFeO2-lncorporated Li2MoO3 as a Cathode Additive for Lithium-Ion Battery Safety", Chemistry of Materials 2012, 24, 2673-2683.

Seo, D. H. et al.: "The structural and chemical origin of the oxygen redox activity in layered and cation-disordered Li-excess cathode materials", Nature Chemistry 2016, 8, (7), 692-7.

Zhou, Y. N. et al.: "Tuning charge-discharge induced unit cell breathing in layer-structured cathode materials for lithium-ion batteries", Nature Communications 2014, 5, 5381.

Xu, J. et al.: "The effect of different binders on electrochemical properties of LiNi1/3Mn1/3Co1/3O2 cathode material in lithium ion batteries", Journal of Power Sources 2013, 225,172-178.

Toby, B. H. et al.: "GSAS-II: the genesis of a modern open-source all purpose crystallography software package", Journal of Applied Crystallography 2013, 46, (2), 544-549.

Kumakura, S. et al.: "Preparation and electrochemical properties of Li2MoO3/C composites for rechargeable Li-ion batteries", Physical Chemistry Chemical Physics 2016, 18, (41), 28556-28563.

Kobayashi, H. et al.: "Synthesis and electrochemical properties of lithium molybdenum oxides", Journal of Power Sources 1999, 81-82, 524-529.

James, A. C. W. P. et al.: "Structure and Bonding in Li2MoO3 and Li2-xMoO3 (0 ? x ? 1.7)", Journal of Solid State Chemistry 1988, 76, 87-96.

Luo, K. et al.: "Anion Redox Chemistry in the Cobalt Free 3d Transition Metal Oxide Intercalation Electrode Li [Li0.2Ni0.2Mn0.6]O2", Journal of the American Chemical Society 2016, 138, (35), 11211-8.

Goodenough, J. B. et al.: "Challenges for Rechargeable Li Batteries", Chemistry of Materials 2010, 22, (3), 587-603.

Julien, C. et al.: "Optimization of Layered Cathode Materials for Lithium-Ion Batteries", Materials 2016, 9, (7), 595.

Li, D. et al.: "Electrochemical behavior of submicron Li2MoO3 as anodes in lithium-ion batteries", Journal of Alloys and Compounds 2016, 682, 759-765.

Jezlorowski, H. et al.: "Raman and Ultraviolet Spectroscopic Characterization of Molybdena on Alumina Catalysts", The Journal of Physical Chemistry 1979, 83, (9), 1166-1173.

Hu, H. et al.: "Surface Structures of Supported Molybdenum Oxide Catalysts: Characterization by Raman and Mo L3-Edge XANES" The Journal of Physical Chemistry 1995, 99, 10897-10910.

Horrocks, G. A. et al.: "Finite size effects on the structural progression induced by lithiation of V2O5: a combined diffraction and Raman spectroscopy study" Journal of Materials Chemistry A 2013, 1, (48), 15265.

Macklin, W. J. et al.:"Structural changes in vanadium oxide-based cathodes during cycling in a lithium polymer electrolyte cell", Electrochimica Acta 1992, 37, (9), 1715-1720.

Kokalj, A. et al.: "Beyond One-Electron Reaction in Li Cathode Materials: Designing Li2MnxFe1-xSiO4", Chemistry of Materials 2007, 19, 3633-3640.

Huggins, R. A., Advanced Batteries; Springer US: New York, NY, 2009.

* cited by examiner

Mo-doped

EARLY TRANSITION METAL STABILIZED HIGH CAPACITY COBALT FREE CATHODES FOR LITHIUM-ION BATTERIES

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present invention relates to cathodes for lithium ion batteries, and more particularly to cobalt-free cathodes for lithium ion batteries.

BACKGROUND OF THE INVENTION

One major technical barrier limiting the energy density of lithium-ion batteries is the lack of robust, high-capacity cathodes. When charged beyond ~4.3 V vs. Li/Li$^+$, traditional layered LiMO$_2$ cathodes (M=Mn, Co, Ni) undergo irreversible structural transformations with concomitant oxygen loss, leading to capacity and voltage fade upon cycling. Understanding and addressing these structural instabilities is vitally important to design next-generation cathodes which can better utilize their Li supply without sacrificing cycle life.

Various cation substitutions have been explored to improve the performance of LiMO$_2$ cathodes. Two notable examples include Ni-rich NMC (LiNi$_x$Mn$_y$Co$_{1-x-y}$O$_2$, x≥0.5) and NCA (for example LiNi$_{0.8}$Co$_{0.15}$Al$_{0.05}$O$_2$) which have reversible capacities as high as 200 mAh/g. Despite their significant improvements over LiCoO$_2$ (~140 mAh/g), NMC and NCA still only utilize ~70% of their Li reserve. An alternative strategy to stabilize the cathode structure at high states of charge is to design composite cathode structures with LiMO$_2$ as the primary Li storage site and with Li$_2$M'O$_3$ as a stabilizing unit. The most prominent among these materials are the layered-layered composites normally referred to as Li—Mn-rich NMC (LMR-NMC, xLi$_2$MnO$_3$·(1-x)LiNi$_y$Mn$_z$Co$_{1-y-z}$O$_2$). After an electrochemical activation step in which Li and O are removed from the Li$_2$MnO$_3$, extremely high reversible capacities ~250 mAh/g can be achieved. However, the viability of LMR-NMC cathodes is limited by Mn dissolution in the electrolyte and voltage fade which occur during extended cycling. First-principles calculations have suggested that the voltage fade of these materials is caused by irreversible migration of Mn to the Li-layer during the first charging cycle.

Li$_2$MoO$_3$ has recently been proposed as a candidate to replace Li$_2$MnO$_3$ in layered-layered composite cathodes, although the synthesis of these Mo-containing composites has not been reported to date. Li$_2$MoO$_3$ has R-3m symmetry and thus is expected to coherently blend with traditional layered LiMO$_2$ materials. Furthermore, Mo can access multiple oxidation states such as Mo$^{4+}$—Mo$^{6+}$, allowing for reversible Li storage in both the Li$_2$MoO$_3$ and LiMO$_2$ moieties. Finally, Li$_2$MoO$_3$ may have improved oxidative stability compared to Li$_2$MnO$_3$ due to reversible anionic charge compensation. Oxygen redox activity in Li-excess layered materials originates from unique Li—O—Li configurations in which electrons can be extracted from unhybridized O 2p states.

Cobalt has been an important component of cathodes for lithium batteries. The limited supply of this material has led to it being one of the most expensive supply materials of the battery manufacturing process. Limiting the need for cobalt in the battery system has therefore become a requirement for improving the affordability and accessibility of electric vehicles and devices.

SUMMARY OF THE INVENTION

A cathode for a lithium battery includes LiNi$_{0.5-x/2}$Mn$_{0.5-x/2}$M$_x$O$_2$ where M is at least one selected from the group consisting of Mo, Ti, Cr, Zr and V, and x is between 0.005-0.02. The LiNi$_{0.5-x/2}$Mn$_{0.5-x/2}$M$_x$O$_2$ can be coated with Mn$_2$P$_2$O$_7$. The Mn$_2$P$_2$O$_7$ can be 1-3 wt. %, based on the total weight of the LiNi$_{0.5-x/2}$Mn$_{0.5-x/2}$ M$_x$O$_2$ and Mn$_2$P$_2$O$_7$. The cathode can be cobalt free. The M can be substituted at cation sites. The cathode can further comprise a conductive carbon and a binder. The usable capacity of the cathode can attain 180 mAh/g when cycled to 4.5 V vs. Li/Li$^+$.

The LiNi$_{0.5-x/2}$Mn$_{0.5-x/2}$M$_x$O$_2$ can be provided as particles having a diameter of from 50 to 500 nm. The LiNi$_{0.5-x/2}$Mn$_{0.5-x/2}$M$_x$O$_2$ can be coated with Mn$_2$P$_2$O$_7$, and the coating can be between 1 and 5 nm thick.

The LiNi$_{0.5-x/2}$Mn$_{0.5-x/2}$M$_x$O$_2$ can be a solid solution wherein the lithium concentration is in excess between 15 to 30 at % to form a lithium excess composition (i.e., Li$_{1+y}$Ni$_{(1-y)(0.5-x/2)}$Mn$_{(1-y)(0.5-x/2)}$M$_{(1-y)x}$O$_2$ where y is between 0.15-0.30 and x is between 0.005-0.02).

A cathode composition for a lithium battery includes LiNi$_{0.5-x/2}$Mn$_{0.5-x/2}$M$_x$O$_2$, where M is at least one selected from the group consisting of M=Mo, Ti, Cr, Zr and V, and x is 0.005-0.02. The LiNi$_{0.5-x/2}$Mn$_{0.5-x/2}$M$_x$O$_2$ can be provided as particles, and the particles can be coated on all sides with Mn$_2$P$_2$O$_7$.

A lithium battery can include a cathode comprising LiNi$_{0.5-x/2}$Mn$_{0.5-x/2}$M$_x$O$_2$, where M is at least one selected from the group consisting of Mo, Ti, Cr, Zr and V, and x is 0.005 to 0.02; an anode; a separator; and an electrolyte. The LiNi$_{0.5-x/2}$Mn$_{0.5-x/2}$M$_x$O$_2$, can be provided as particles, and the particles can be coated on all sides with Mn$_2$P$_2$O$_7$. The usable capacity of the cathode can attain 180 mAh/g when cycled between 2.0-4.5 V vs. Li/Li$^+$.

A method of making a lithium battery can include the steps of providing LiNi$_{0.5-x/2}$Mn$_{0.5-x/2}$M$_x$O$_2$, where M is at least one selected from the group consisting of Mo, Ti, Cr, Zr and V, and x is 0.005 to 0.02; mixing the LiNi$_{0.5-x/2}$Mn$_{0.5-x/2}$M$_x$O$_2$ with conductive carbon, a binder and a solvent to form a slurry, and casting the slurry onto a current collector and drying the slurry to form a cathode; and combining the cathode with an anode, a separator and an electrolyte to form a battery. The binder can be PVDF. The solvent can be N-Methyl-2-Pyrrolidone (NMP). The electrolyte can be 1.2 M LiPF$_6$ in EC-EMC in 3:7 weight ratio. The anode composition can be a mixture of graphite and a binder.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
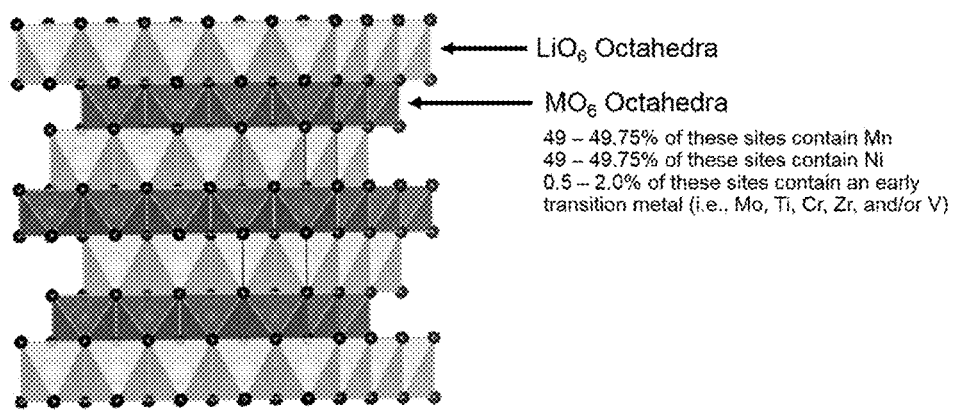
FIG. 1 is a schematic drawing of the crystal structure of LiNi$_{0.5-x/2}$Mn$_{0.5-x/2}$M$_x$O$_2$.

A cathode for a lithium battery includes $LiNi_{0.5-x/2}Mn_{0.5-x/2}M_xO_2$ where M is at least one selected from the group consisting of Mo, Ti, Cr, Zr and V, and x is between 0.005-0.02. The $LiNi_{0.5-x/2}Mn_{0.5-x/2}M_xO_2$ can be coated with $Mn_2P_2O_7$. The $Mn_2P_2O_7$ can be 1-3 wt. %, based on the total weight of the $LiNi_{0.5-x/2}Mn_{0.5-x/2}M_xO_2$ and $Mn_2P_2O_7$.

The $LiNi_{0.5-x/2}Mn_{0.5-x/2}M_xO_2$ can be provided as particles having a diameter from 50 to 500 nm. The diameter of the $LiNi_{0.5-x/2}Mn_{0.5-x/2}M_xO_2$ particles can be 50, 75, 100, 125, 150, 175, 200, 225, 250, 275, 300, 325, 350, 375, 400, 425, 450, 475, or 500 nm, or within a range of any high value and low value selected from these values.

The $LiNi_{0.5-x/2}Mn_{0.5-x/2}M_xO_2$ particles can be coated with $Mn_2P_2O_7$. The $Mn_2P_2O_7$ coating on the $LiNi_{0.5-x/2}Mn_{0.5-x/2}M_xO_2$ can cover all sides of the particles. The $Mn_2P_2O_7$ coating can be 1, 1.25, 1.5, 1.75, 2, 2.25, 2.5, 2.75, 3, 3.25, 3.5, 3.75, 4, 4.25, 4.5, 4.75 or 5 nm thick, or can be within a range of any high value and low value selected from these values.

The cathode of the invention can be cobalt free. The cathode can further contain a conductive carbon and a binder. Any suitable conductive carbon can be used. The specific surface area of many carbon blacks is typically in the range of 50-250 $m^2$/g. Two common carbon additives for LIB cathodes include Super P Li and C65 (Imerys Graphite and Carbon, Bironicom Switzerland). The binder can be poly(vinylidene fluoride) (PVDF), and can be used in both the cathode and the anode. Other binders are possible, such as carboxymethyl cellulose (CMC).

The $LiNi_{0.5-x/2}Mn_{0.5-x/2}M_xO_2$ can be a solid solution where the lithium concentration is in excess between 15 to 30 at %. This will form a lithium excess composition such as $Li_{1+y}Ni_{(1-y)(0.5-x/2)}Mn_{(1-y)(0.5-x/2)}M_{(1-y)x}O_2$ where y is between 0.15-0.30 and x is between 0.005-0.02.

The usable capacity of the cathode attains 180 mAh/g when cycled between 2.0-4.5 V vs. $Li/Li^+$.

A cathode composition for a lithium battery can be provided. The cathode composition includes $LiNi_{0.5-x/2}Mn_{0.5-x/2}M_xO_2$, where M is at least one selected from the group consisting of M=Mo, Ti, Cr, Zr and V, and x is 0.005-0.02. The $LiNi_{0.5-x/2}Mn_{0.5-x/2}M_xO_2$ can be coated with $Mn_2P_2O_7$. The $Mn_2P_2O_7$ can be 1-3 wt. %, based on the total weight of the $LiNi_{0.5-x/2}Mn_{0.5-x/2}M_xO_2$ and $Mn_2P_2O_7$. The $LiNi_{0.5-x/2}Mn_{0.5-x/2}M_xO_2$ can be provided as particles having a diameter from 50 to 500 nm. The $LiNi_{0.5-x/2}Mn_{0.5-x/2}M_xO_2$ particles can be coated with $Mn_2P_2O_7$. The $Mn_2P_2O_7$ coating on the $LiNi_{0.5-x/2}Mn_{0.5-x/2}M_xO_2$ can cover all sides of the particles and can be from 1 to 5 nm thick.

A lithium battery according to the invention can include a cathode comprising $LiNi_{0.5-x/2}Mn_{0.5-x/2}M_xO_2$, where M is at least one selected from the group consisting of Mo, Ti, Cr, Zr and V, and x is 0.005 to 0.02. The battery includes an anode, a separator, and an electrolyte.

Any suitable anode material can be used. The anode can be a mixture of graphite and a binder. The anode can material can also be $Li_5Ti_4O_{12}$ (LTO). Carbon additives such as include Super P Li and C65 can also be included in the anode.

Any suitable separator can be used. Porous polyolefins are common separator materials. The separator can be Celgard 2325 (Celgard LLC, Charlotte N.C.) and one sheet of glass microfiber (Whatman). Celgard 2400 and 2500 are also compatible separators.

Any suitable electrolyte can be used. The electrolyte can be 1.2 M $LiPF_6$ in EC-DMC in 3:7 weight ratio. $LiPF_6$ dissolved in liquid carbonates is a standard electrolyte system for LIBs. Two other common formulations include 1 M $LiPF_6$ in EC/DMC (1/1 wt ratio), and 1.2 M $LiPF_6$ in EC/EMC (3/7 wt ratio).

The battery can be cobalt free. The usable capacity of the cathode attains 180 mAh/g when cycled between 2.0-4.5 V vs. Li/Li$^+$.

A method of making a lithium battery can include the step of providing LiNi$_{0.5-x/2}$Mn$_{0.5-x/2}$M$_x$O$_2$, where M is at least one selected from the group consisting of Mo, Ti, Cr, Zr and V, and x is 0.005 to 0.02. The LiNi$_{0.5-x/2}$Mn$_{0.5-x/2}$M$_x$O$_2$ is mixed with conductive carbon, a binder and a solvent to form a slurry. The slurry can be cast onto a current collector. Any suitable solvent can be used. An example of a suitable solvent is N-Methyl-2-Pyrrolidone. The slurry can be dried to form a cathode. The cathode can be combined with an anode, a separator and an electrolyte to form a battery.

FIG. 1 is a schematic drawing of the crystal structure of LiNi$_{0.5-x/2}$Mn$_{0.5-x/2}$M$_x$O$_2$. The M is substituted at cation sites. There is shown the LiO$_6$ octahedra, the MO$_6$ octahedra where 49-49.75% of these sites contain Mn, 49-49.75% of these sites contain Ni, and 0.5-2.0% of these sites contain an early transition metal such as Mo, Ti, Cr, Zr, and/or V.

Example I

LiNi$_{0.5-x/2}$Mn$_{0.5-x/2}$Mo$_x$O$_2$ powders were synthesized using a sol-gel procedure where Li(CH$_3$COO).2H$_2$O, Ni(OCOCH$_3$)$_2$.4H$_2$O, Mn(CH$_3$COO)$_2$.4H$_2$O, (NH4)$_6$Mo$_7$O$_{24}$.4H$_2$O, and citric acid were dissolved in deionized water in the appropriate molar ratio to obtain the desired stoichiometry. The solution was gently heated to 60° C. while stirring to slowly evaporate the water and produce a solid precursor which was heated at 400° C. (5° C./min ramp rate) for 4 h in air followed by a final heat treatment at 850° C. (5° C./min) for 15 h in air.

Electrode slurries were prepared by mixing LiNi$_{0.5-x/2}$Mn$_{0.5-x/2}$Mo$_x$O$_2$, Super P Li carbon black, and poly(vinylidene fluoride) (PVDF) (80/10/10 weight ratio) in N-Methyl-2-pyrrolidone (NMP). The slurry was cast onto a carbon-coated Al foil current collector and dried overnight before preparing electrochemical cells. CR2032 half cells were constructed in an Ar-filled glovebox using a slurry cast cathode and a Li metal counter/reference electrode. The electrolyte was 1.2 M LiPF$_6$ in a mixture of ethylene carbonate and ethyl methyl carbonate (3/7 by weight). The separator consisted of one sheet of Celgard 2325 and one sheet of glass microfiber (Whatman). Galvanostatic charge/discharge experiments were conducted on a MACCOR Series 4000 battery tester. Cyclic voltammograms were collected using a Biologic VSP potentiostat.

Figure 2:
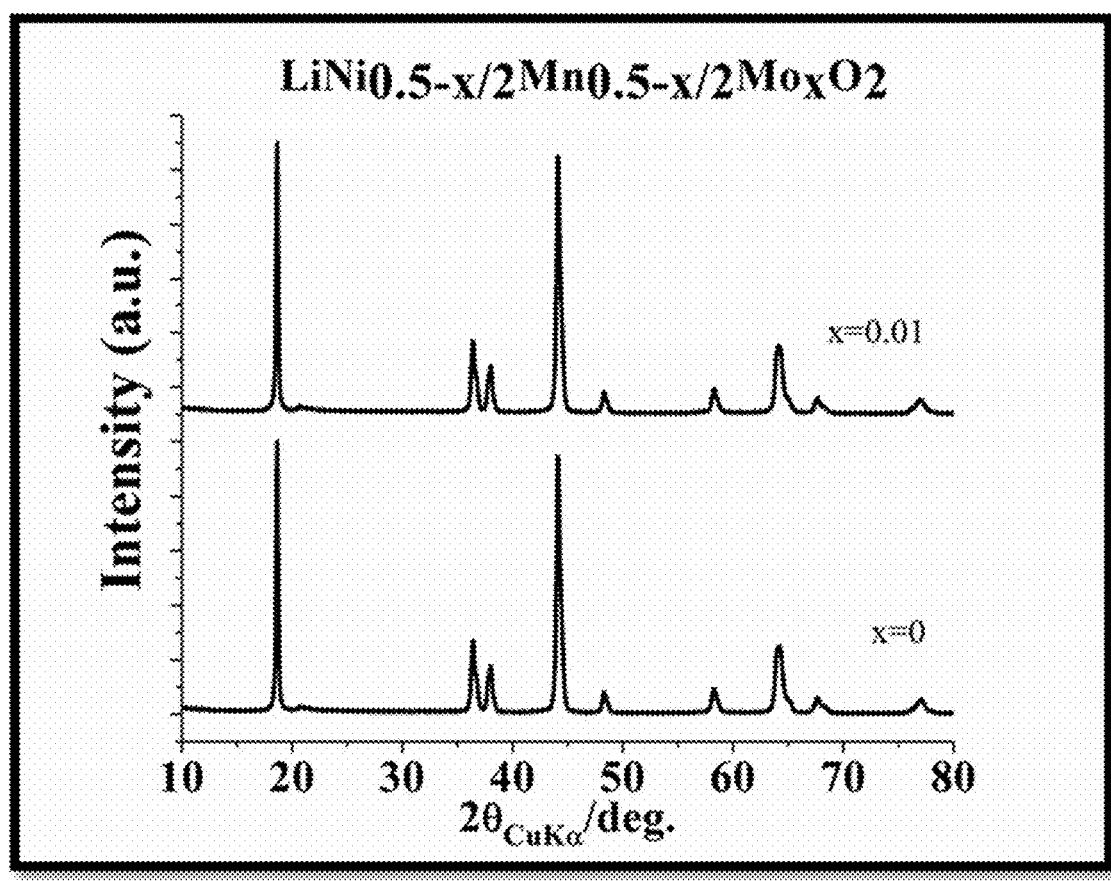
FIG. 2 is a graph of intensity (a.u) v. 2θ$_{CuK\alpha}$/deg. showing the Mo doped LiNi$_{0.5}$Mn$_{0.5}$O$_2$ X-ray diffraction pattern.

FIG. 2 is a graph of intensity (a.u) v. 2θ$_{CuK\alpha}$/deg. showing the Mo doped LiNi$_{0.5}$Mn$_{0.5}$O$_2$, X-ray diffraction pattern. The Bragg diffraction peaks are indexed to the typical hexagonal layered α-NaFeO$_2$ structure (space group: R-3m). The broad peaks in the 2θ range of 20-25° are characteristic of the Li$_2$MnO$_3$ structure which belongs to a space group C2/m. Mo(1%) doped LiNi$_{0.5}$Mn$_{0.5}$O$_2$ was synthesized by a sol-gel process.

Figure 3:
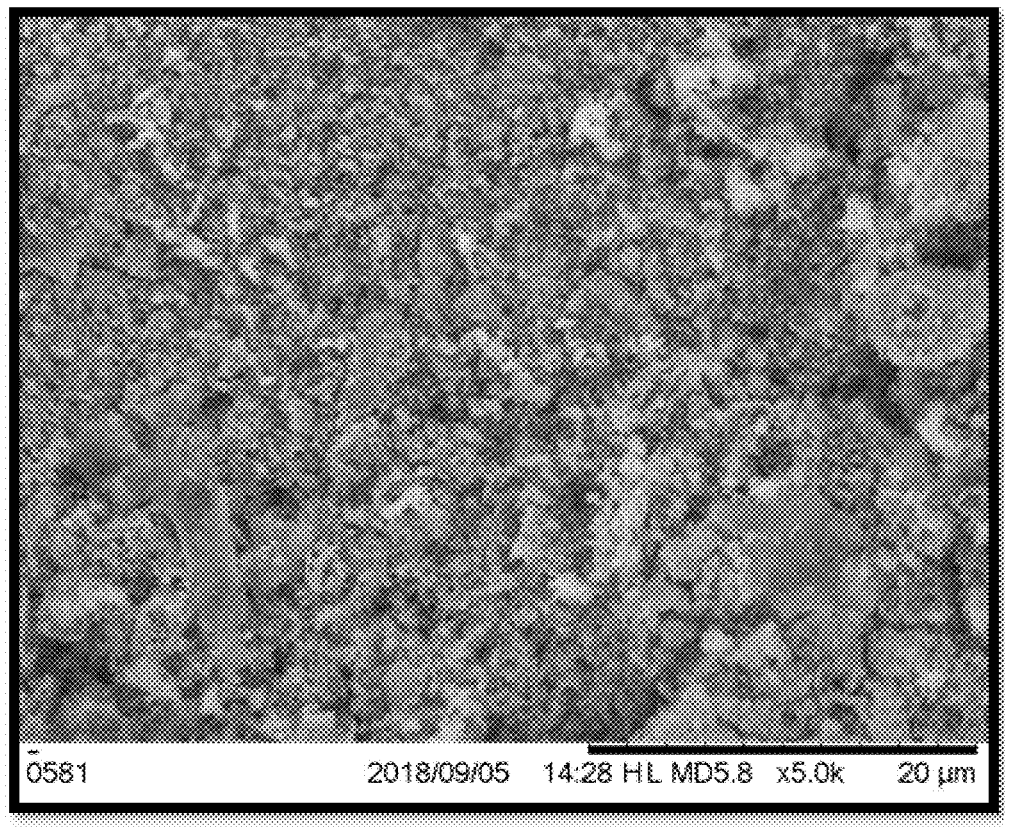
FIG. 3 is a SEM image of a baseline $LiNi_{0.5}Mn_{0.5}O_2$ without Mo doping.
Figure 4:
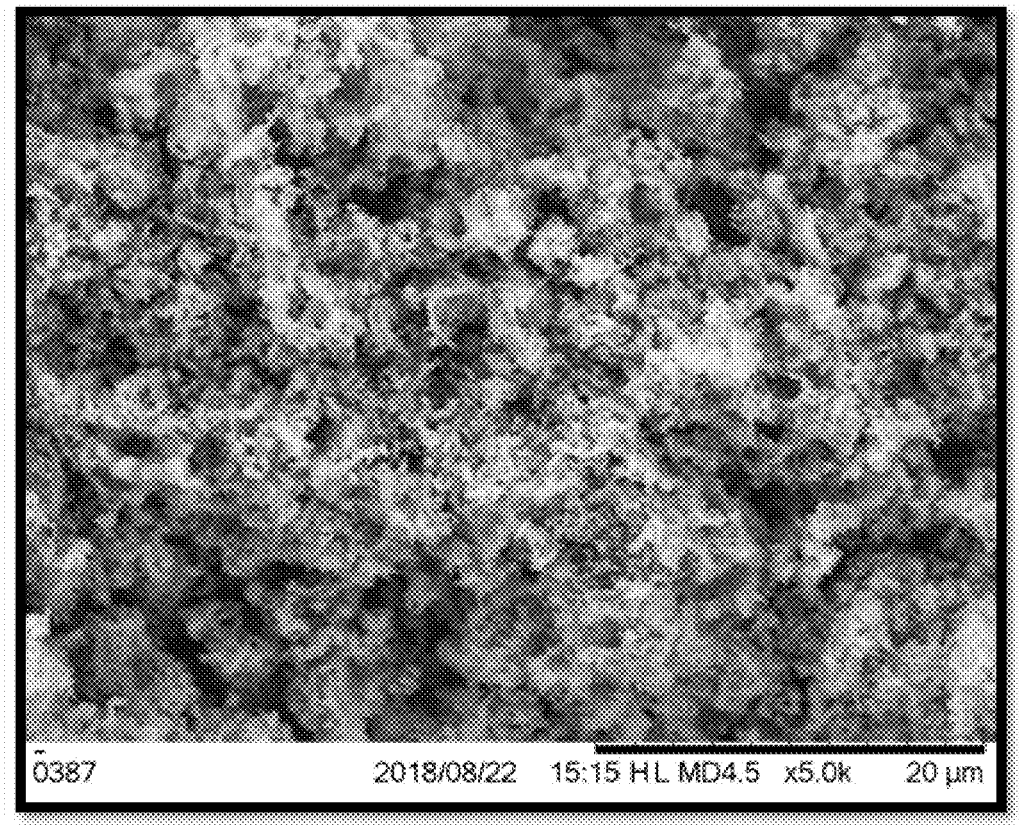
FIG. 4 is a SEM image of Mo doped $LiNi_{0.5}Mn_{0.5}O_2$.

FIG. 3 is a SEM image of a baseline LiNi$_{0.5}$Mn$_{0.5}$O$_2$ without Mo doping. FIG. 4 is a SEM image of Mo doped LiNi$_{0.5}$Mn$_{0.5}$O$_2$. There are no major differences in the morphology of the LiNi$_{0.5}$Mn$_{0.5}$O$_2$ vs. the Mo-doped compound.

Figure 5:
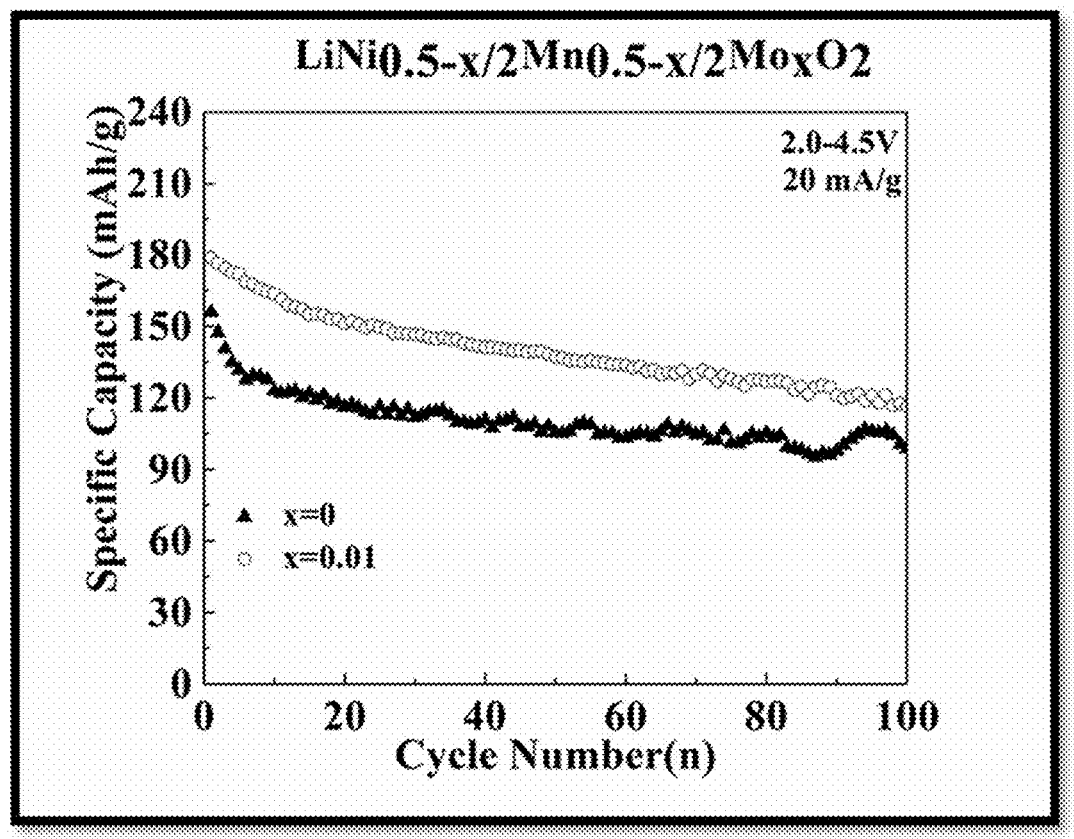
FIG. 5 is a graph of specific capacity (mAh/g) v. cycle number (n) for $LiNi_{0.5-x/2}Mn_{0.5-x/2}Mo_xO_2$, x=0 and x=0.01 cycled between 2.0-4.5 V vs. $Li/Li^+$ at a specific current of 20 mA/g.

FIG. 5 is a graph of specific capacity (mAh/g) v. cycle number(n) for LiNi$_{0.5-x/2}$Mn$_{0.5-x/2}$Mo$_x$O$_2$, x=0 and x=0.01 and cycled between 2.0-4.5 V and at specific current density of 20 mA/g. The electrochemical properties of the materials were evaluated by a CR2032 coin-type cell with lithium foil as a reference electrode. The working electrode was prepared by a coating slurry, (80 wt %) as active materials, Super P (10 wt %) and PVDF (10 wt %) as binder within NMP, onto carbon coated aluminum foils and dried overnight at 120° C. A porous polypropylene film and glass fiber was used as separator. The Mo doped cathode shows a higher specific capacity at 20 mA/g between 2.0-4.5 V compared to the baseline.

Figure 6:
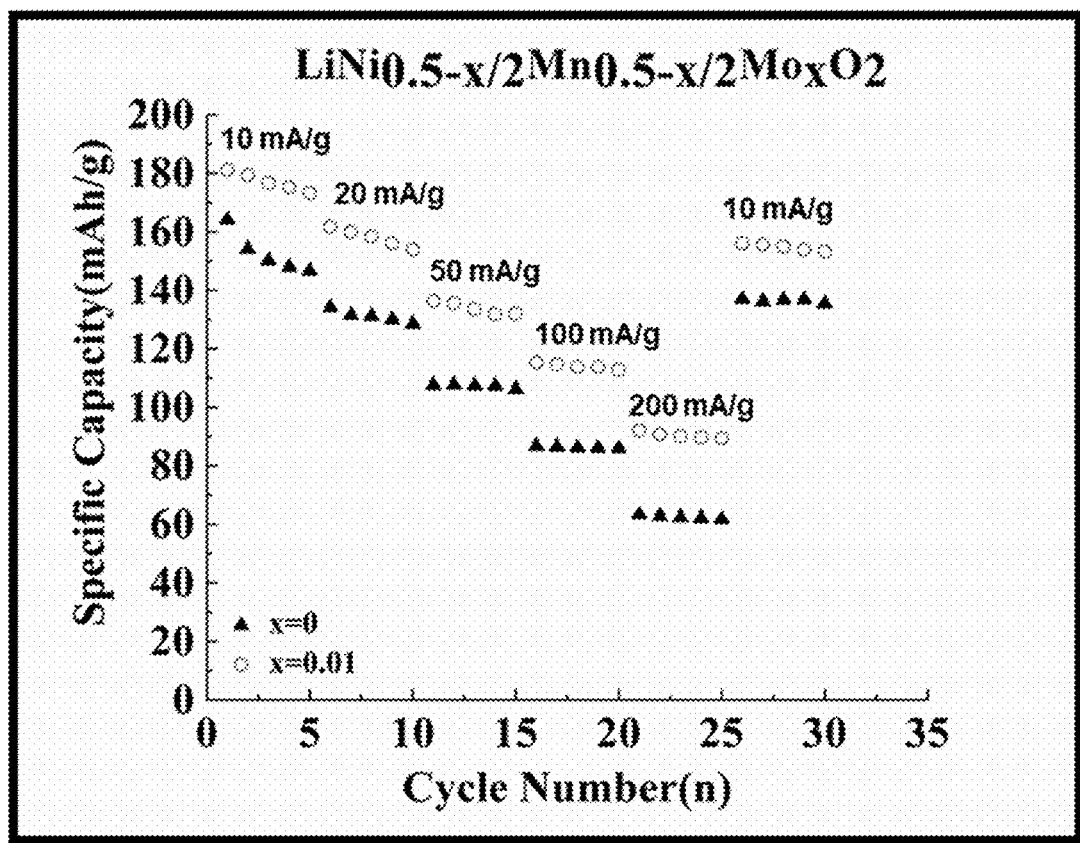
FIG. 6 is a graph of specific capacity (mAh/g) v. cycle number (n) for $LiNi_{0.5-x/2}Mn_{0.5-x/2}Mo_xO_2$ x=0 and x=0.01 cycled between 2.0-4.5 V vs. $Li/Li^+$ at specific current density of 10-200 mA/g.

FIG. 6 is a graph of specific capacity (mAh/g) v. cycle number (n) for LiNi$_{0.5-x/2}$Mn$_{0.5-x/2}$Mo$_x$O$_2$ x=0 and x=0.01 and at specific current density of 10-200 mA/g, and showing rate capability cycled between 2.0-4.5 V. The Mo-doped material has a higher capacity at specific current density of 10-200 mA/g.

Figure 7:
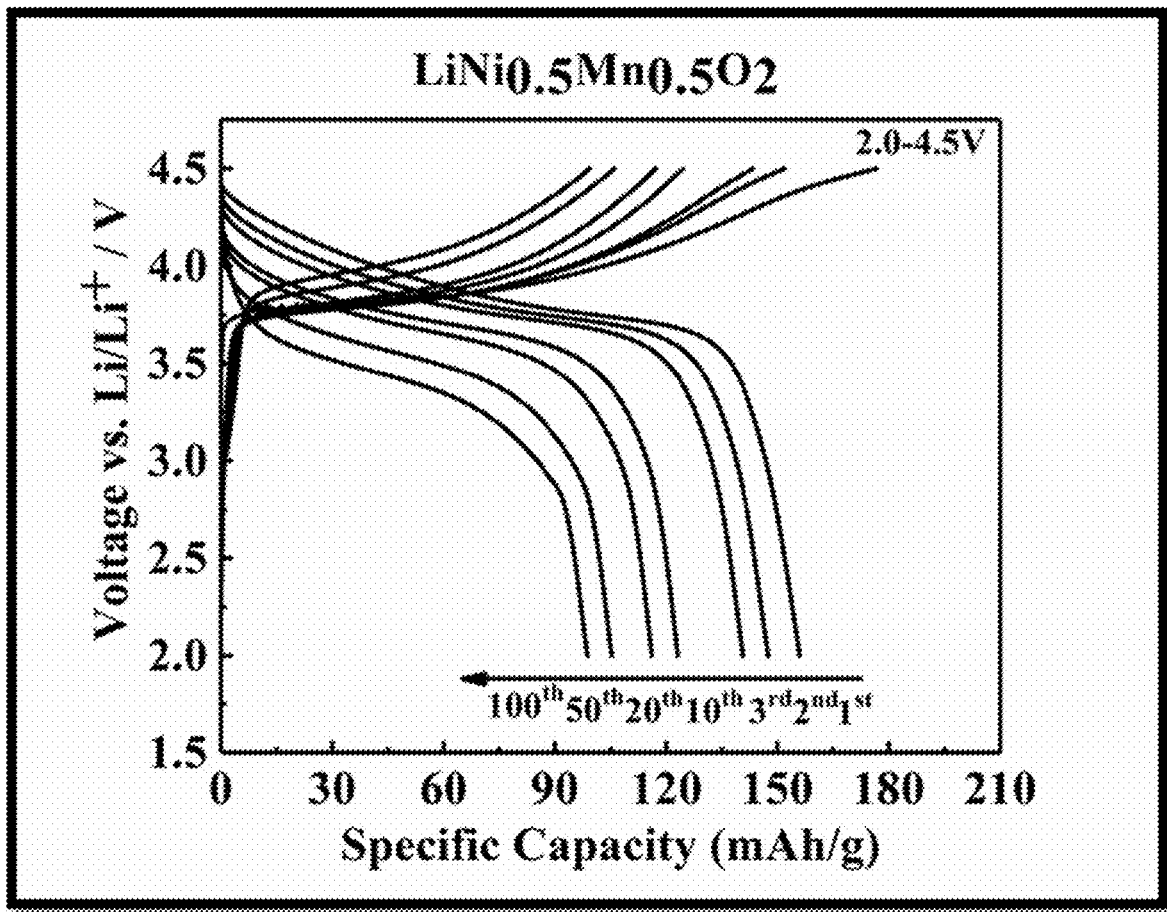
FIG. 7 is a graph of voltage vs. $Li/Li^+$/V vs. specific capacity (mAh/g) showing electrochemical characterization for baseline $LiNi_{0.5}Mn_{0.5}O_2$.
Figure 8:
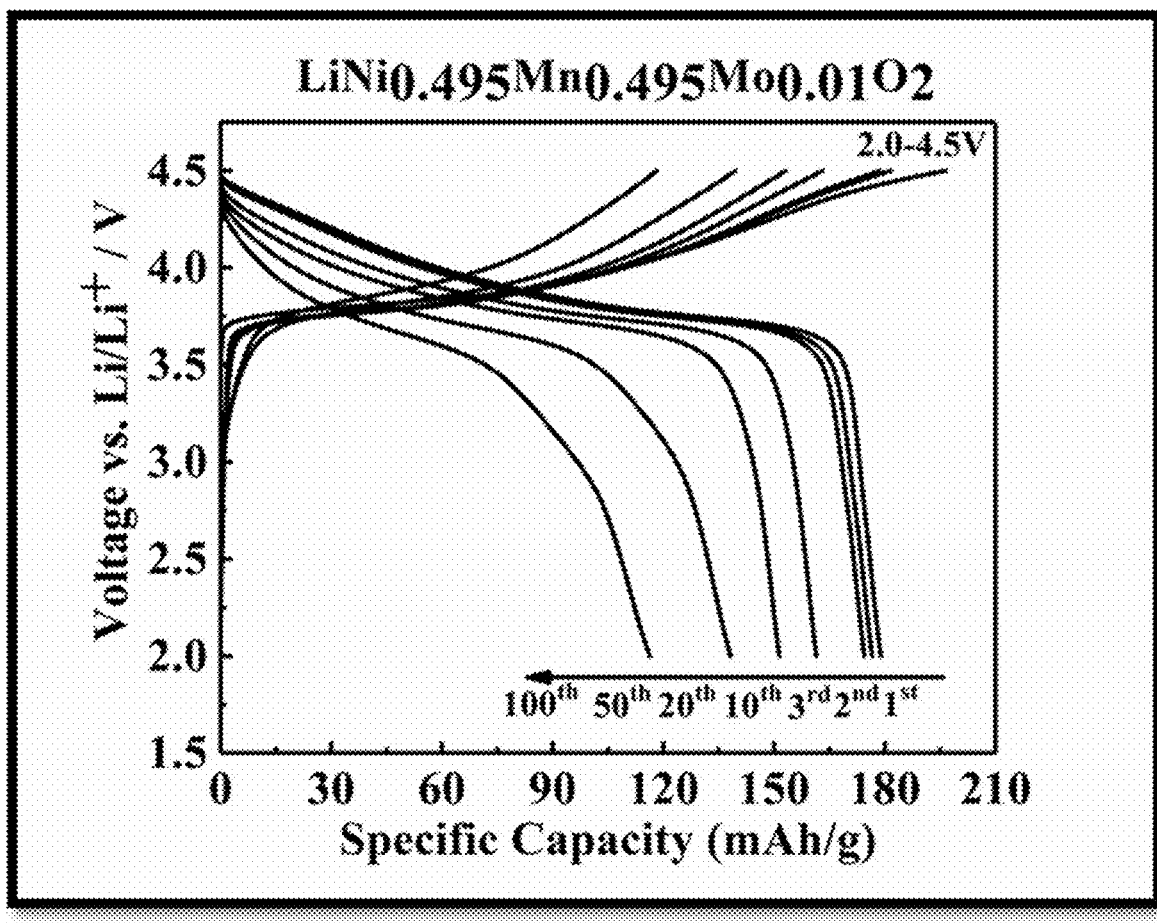
FIG. 8 is a graph of voltage vs. $Li/Li^+$/V vs. specific capacity (mAh/g) for $LiNi_{0.495}Mn_{0.495}Mo_{0.01}O_2$ collected a specific current density of 20 mA/g.

FIG. 7 is a graph of voltage vs. Li/Li$^+$/V vs. specific capacity (mAh/g) showing electrochemical characterization for baseline LiNi$_{0.5}$Mn$_{0.5}$O$_2$. The charge/discharge cycle at a specific current density of 20 mA/g between 2.0-4.5V is plotted. FIG. 8 is a graph of voltage vs. Li/Li$_+$/V vs. specific capacity (mAh/g) showing electrochemical characterization for Li Ni$_{0.495}$Mn$_{0.495}$Mo$_{0.01}$O$_2$. The charge/discharge cycle at a specific current density of 20 mA/g between 2.0-4.5 V is plotted. It can be seen comparing FIG. 7 and FIG. 8 that the presence of Mo does not impact the voltage profile.

Figure 9:
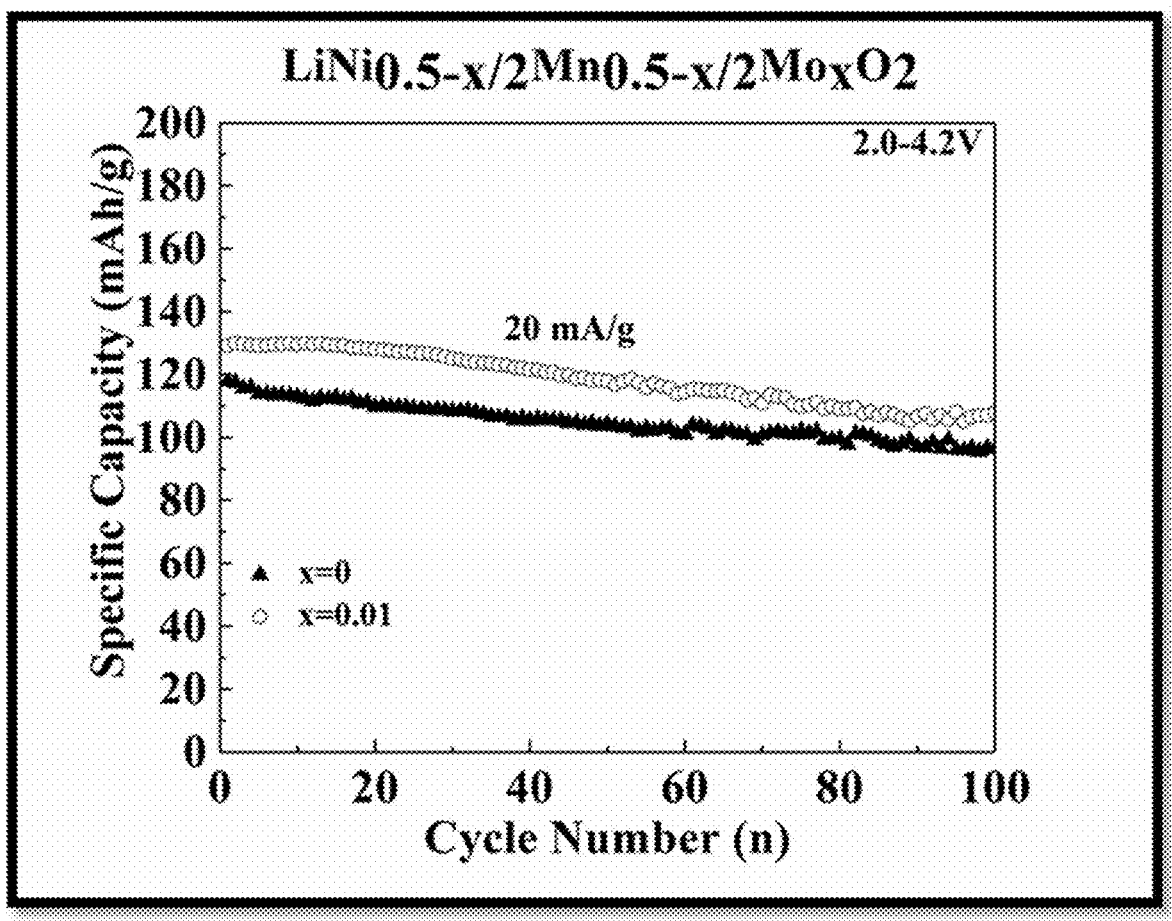
FIG. 9 is a graph of specific capacity (mAh/g) v. cycle number (n) for $LiNi_{0.5-x/2}Mn_{0.5-x/2}M_xO_2$ cycled between 2.0-4.2 V vs. $Li/Li^+$ at a specific current density of 20 mA/g.
Figure 10:
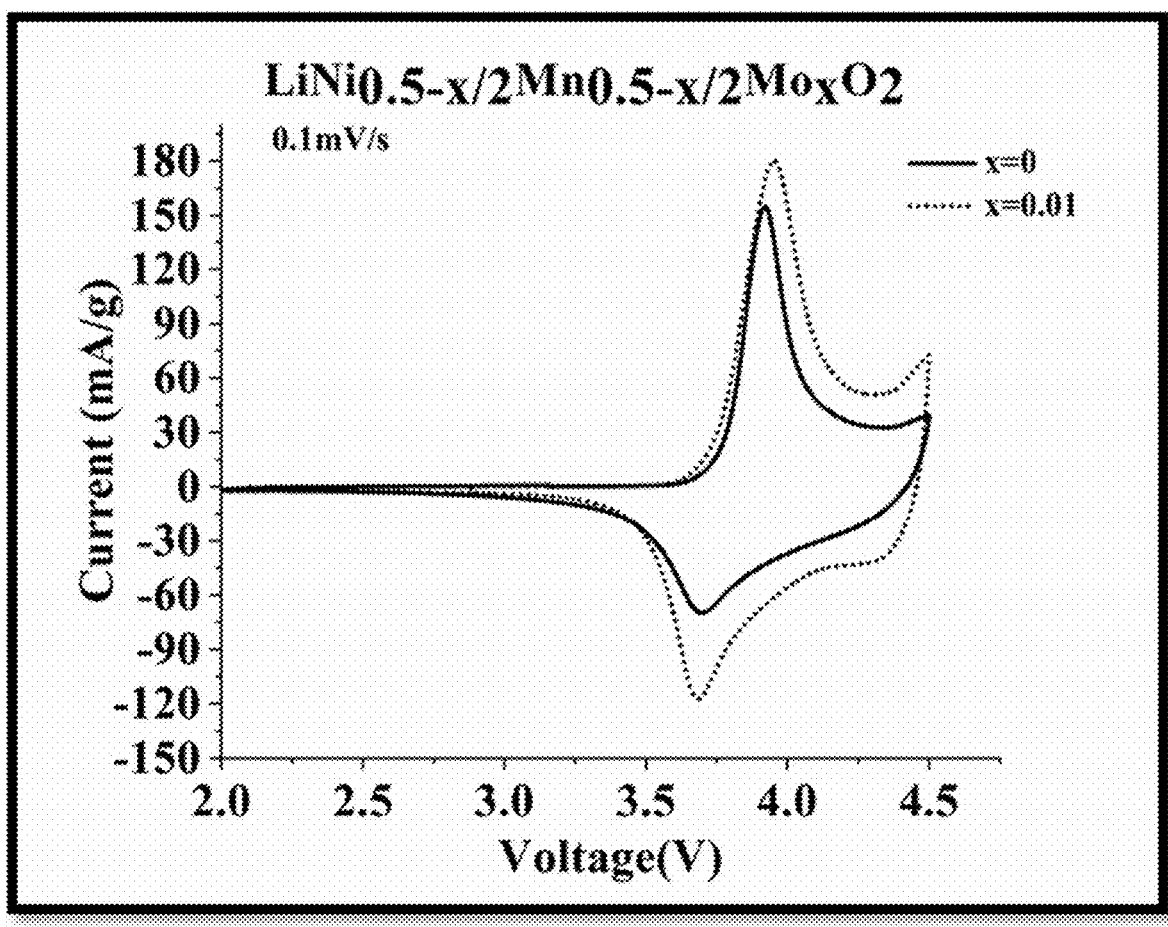
FIG. 10 is graph of specific current ($mA/g_{active\ material}$) V. voltage (V) for $LiNi_{0.5-x/2}Mn_{0.5-x/2}Mo_xO_2$ and x=0 and x=0.01 collected at a scan rate of 0.1 mV/s.

FIG. 9 is a graph of specific capacity (mAh/g) v. cycle number (n) for LiNi$_{0.5-x/2}$Mn$_{0.5-x/2}$M$_x$O$_2$ at 2.0-4.2 V and specific current density of 20 mA/g. The Mo doped cathode shows a stable cyclability at 20 mA/g between 2.0-4.2 V. FIG. 10 is graph of specific current (mA/g$_{active\ material}$) v. voltage (V) for LiNi$_{0.5-x/2}$Mn$_{0.5-x/2}$M$_x$O$_2$ and x=0 and x=0.01. Cyclic voltammograms collected at 0.1 mV/s between 2.0-4.5 V are shown in FIG. 10. The cyclic voltammetry shows that the Mo-doped material shows higher peak currents compared to the unmodified material. This result is consistent with the higher capacities measured during galvanostatic charge/discharge.

Figure 11:
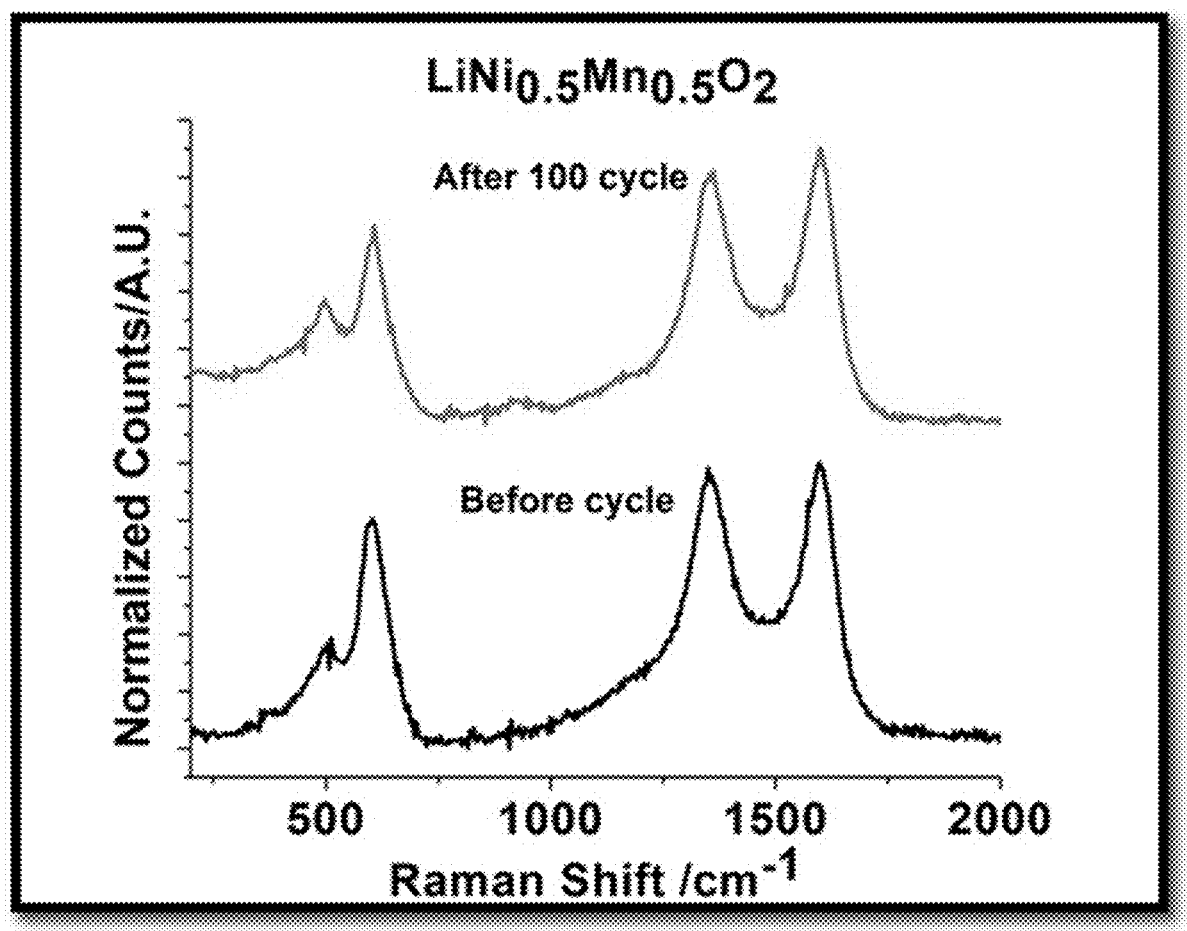
FIG. 11 is a graph of normalized counts/A.U v. Raman shift/$cm^{-1}$ before and after 100 cycles for a baseline $LiNi_{0.5}Mn_{0.5}O_2$.
Figure 12:
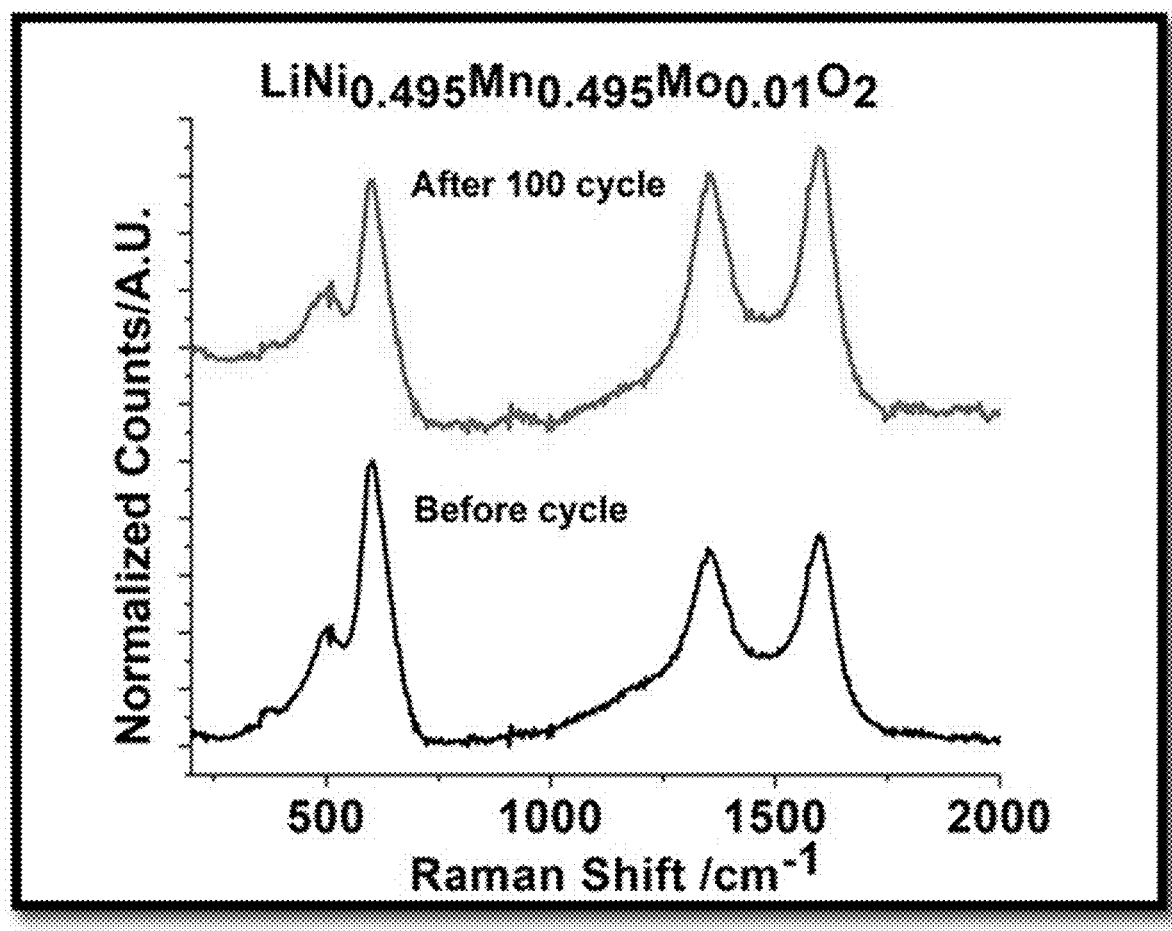
FIG. 12 is a graph of normalized counts/A.U v. Raman shift/$cm^{-1}$ before and after 100 cycles for $LiNi_{0.495}Mn_{0.495}Mo_{0.01}O_2$.

FIG. 11 is a graph of normalized counts/A.U v. Raman shift/cm$^{-1}$ before and after 100 cycles for a baseline LiNi$_{0.5}$Mn$_{0.5}$O$_2$. FIG. 12 is a graph of normalized counts/A.U v. Raman shift/cm$^{-1}$ before and after 100 cycles for LiNi$_{0.495}$Mn$_{0.495}$Mo$_{0.01}$O$_2$. No major change in the Raman bands indicates that the structure is stable upon repeated Li insertion/extraction.

Example II

LiNi$_{0.5-x/2}$Mn$_{0.5-x/2}$Mo$_x$O$_2$ powders were synthesized using a sol-gel procedure wherein Li(CH3COO).2H$_2$O, Ni(OCOCH$_3$)$_2$.4H$_2$O, Mn(CH3COO)$_2$.4H$_2$O, (NH$_4$)$_6$Mo$_7$O$_{24}$.4H$_2$O, and citric acid were dissolved in deionized water in the appropriate molar ratio to obtain the desired stoichiometry. The solution was gently heated while stirring to slowly evaporate the water and produce a solid precursor which was heated at 400° C. (5° C./min ramp rate) for 4 h in air followed by a final heat treatment at 850° C. (5° C./min) for 15 h in air.

To apply the Mn$_2$P$_2$O$_7$ coatings, LiNi$_{0.5-x/2}$Mn$_{0.5-x/2}$Mo$_x$O$_2$ powder was added under continuous stirring to a solution containing Mn(CH$_3$COO)$_2$.4H$_2$O dissolved in 10 mL deionized water (Suspension A). Meanwhile, a stoichiometric amount of NH$_4$H$_2$PO$_4$ was dissolved in 10 mL deionized water (Solution B). Solution B was added dropwise to Suspension A under continuous stirring over the course of 1 hr. The resulting suspension was dried at 60° C., and the resulting solid powder was heated at 300° C. (2° C./min ramp rate) for 5 h in air to obtain the Mn$_2$P$_2$O$_7$-coated LiNi$_{0.5-x/2}$Mn$_{0.5-x/2}$Mo$_x$O$_2$.

Electrode slurries were prepared by mixing LiNi$_{0.5-x/2}$Mn$_{0.5-x/2}$Mo$_x$O$_2$, Super P Li carbon black, and poly(vinylidene fluoride) (PVDF) (80/10/10 weight ratio) in N-Methyl-2-pyrrolidone (NMP). The slurry was cast onto a carbon-coated Al foil current collector and dried overnight before preparing electrochemical cells. CR2032 half cells were constructed in an Ar-filled glovebox using a slurry cast cathode and a Li metal counter/reference electrode. The electrolyte was 1.2 M $LiPF_6$ in a mixture of ethylene carbonate and ethyl methyl carbonate (3/7 by weight). The separator consisted of one sheet of Celgard 2325 and one sheet of glass microfiber (Whatman). Galvanostatic charge/discharge experiments were conducted on a MACCOR Series 4000 battery tester. Cyclic voltammograms were collected using a Biologic VSP potentiostat.

Figure 13:
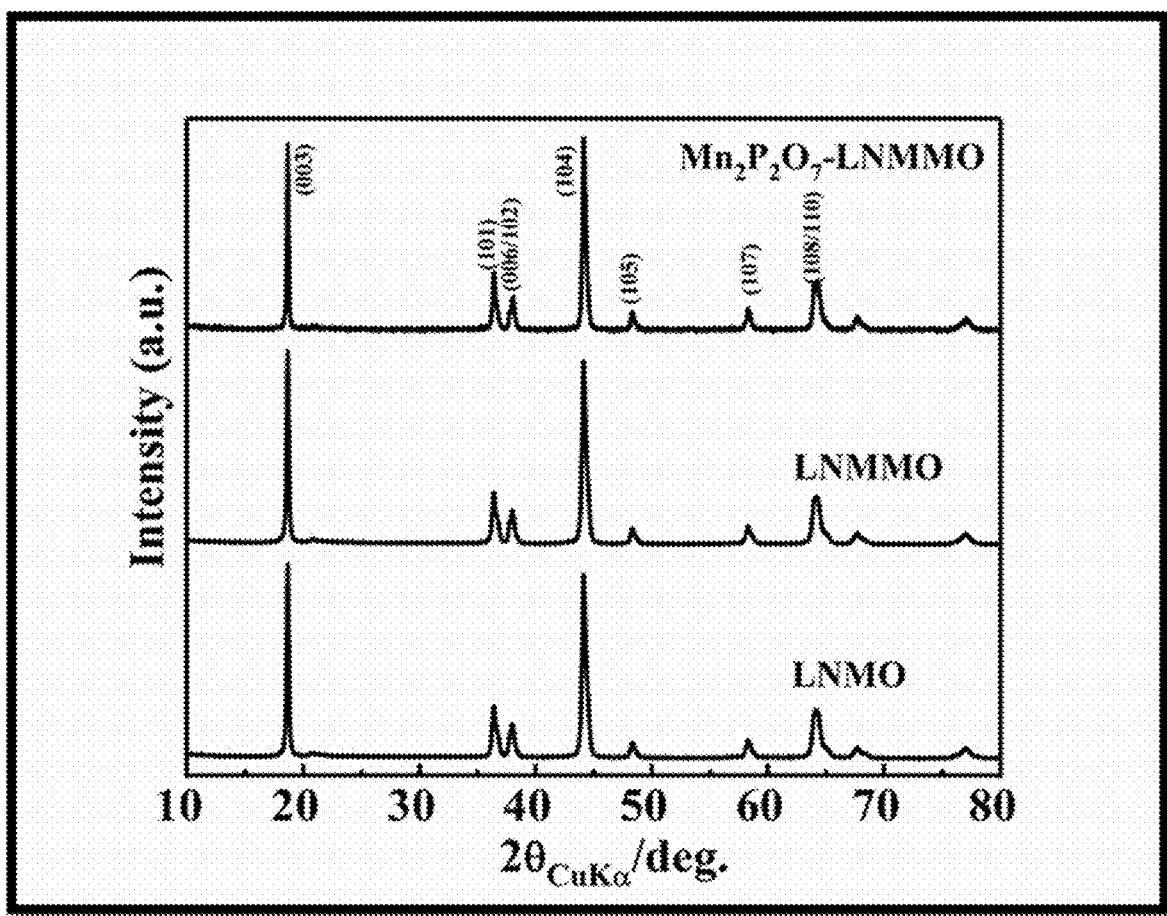
FIG. 13 is a graph of intensity (a.u) v. $2\theta_{CuK\alpha}$/deg. showing the X-ray diffraction pattern for Mo doped $LiNi_{0.5}Mn_{0.5}O_2$ cathode coated with $Mn_2P_2O_7$.

FIG. 13 is a graph of intensity (a.u) v. $2\theta_{CuK\alpha}$/deg. showing synthesis of a $Mn_2P_2O_7$ coating on Mo doped $LiNi_{0.5}Mn_{0.5}O_2$. Manganese acetate was dissolved in distilled water before adding as synthesized Mo (1%) doped $LiNi_{0.5}Mn_{0.5}O_2$ under continuous stirring (Solution A). Meanwhile diammonium hydrogen phosphate was dissolved in distilled water (Solution B). Solution B was added to Solution A dropwise within 3 hr of continuous stirring and dried at 60° C. The dried powder obtained was heated to 300° C. for 5 hr in air atmosphere. (heating rate 2° C./min). $Mn_2P_2O_7$ coating is about 2 wt. %. The Bragg diffraction peaks are indexed to the typical hexagonal layered α-$NaFeO_2$ structure (space group: R-3m). The broad peaks in the 2θ range of 20-25° are characteristic of the $Li_2MnO_3$ structure which belongs to a space group C2/m.

Figure 14:
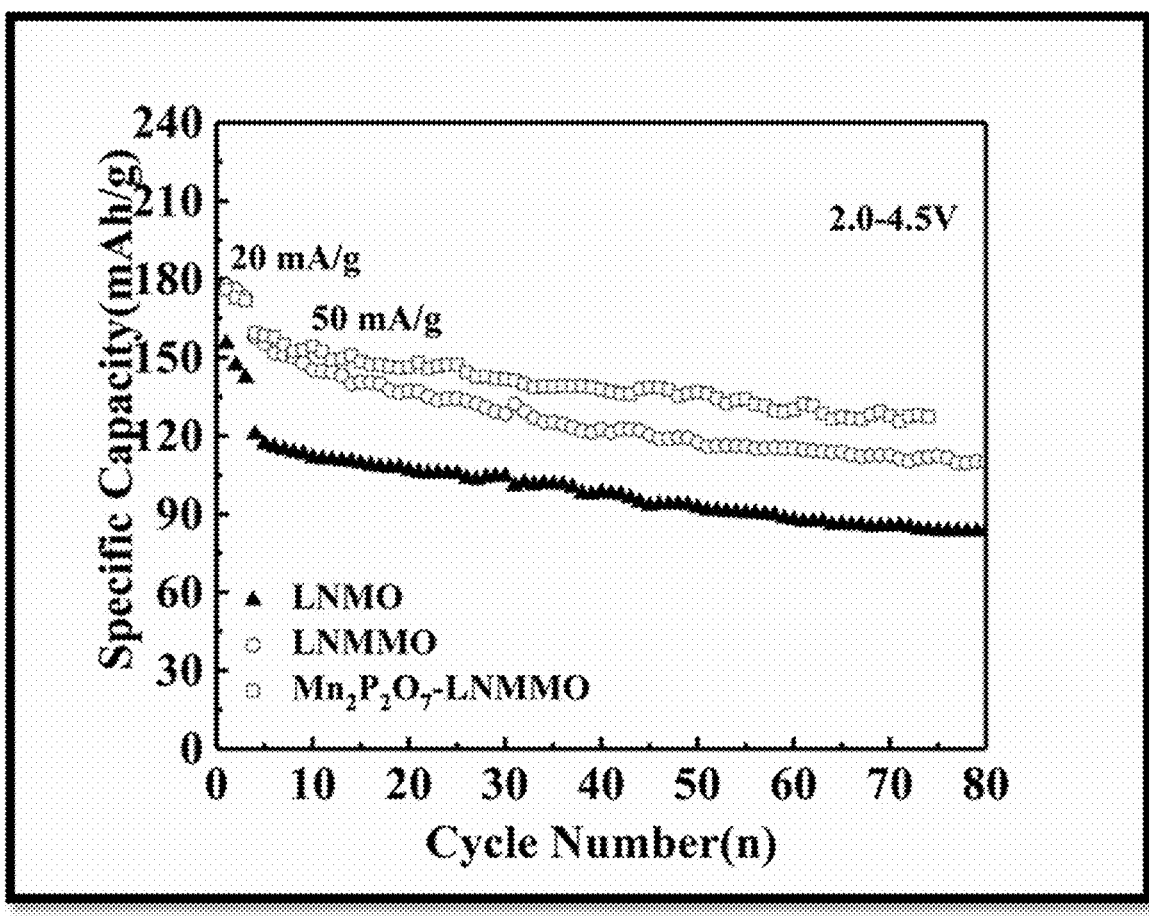
FIG. 14 is a graph of specific capacity (mAh/g) v. cycle number (n) for $LiNi_{0.5}Mn_{0.5}O_2$ (LNMO), $LiNi_{0.495}Mn_{0.495}Mo_{0.01}O_2$ (LNMMO), and $Mn_2P_2O_7$-LNMMO, showing the electrochemical characterization for $Mn_2P_2O_7$ coated on a Mo doped $LiNi_{0.5}Mn_{0.5}O_2$ cathode, cycled between 2.0-4.5 V vs. $Li/Li^+$ at specific current density of 20-50 mA/g.

FIG. 14 is a graph of specific capacity (mAh/g) v. cycle number (n) for LNMO, LNMMO, and $Mn_2P_2O_7$-LNMMO for $Mn_2P_2O_7$ coated on an Mo doped $LiNi_{0.5}Mn_{0.5}O_2$ cathode, cycled between 2.0-4.5 V at a specific current density of 20-50 mA/g. The electrochemical properties of the materials were evaluated by a CR2032 coin-type cell with lithium foil as a reference electrode. The working electrode was prepared by coating slurry, (80 wt %) as active materials, Super P (10 wt %) and PVDF (10 wt %) as binder within NMP, onto carbon coated aluminum foils and dried overnight at 120° C. A porous polypropylene film and glass fiber was used as separator. The electrolyte(Gen 2) was composed of 1.2 M $LiPF_6$ dissolved in a mixed organic solvent of ethylene carbonate (EC), ethyl methyl carbonate (EMC) (3:7 in weight ratio). The coin-type cells were assembled in an Ar-filled glovebox. The $Mn_2P_2O_7$-coated cathode shows higher specific capacity when cycled between 2.0-4.5 V vs. $Li/Li^+$ compared to the Mo doped LNMMO and undoped LNMO cathodes.

Figure 15:
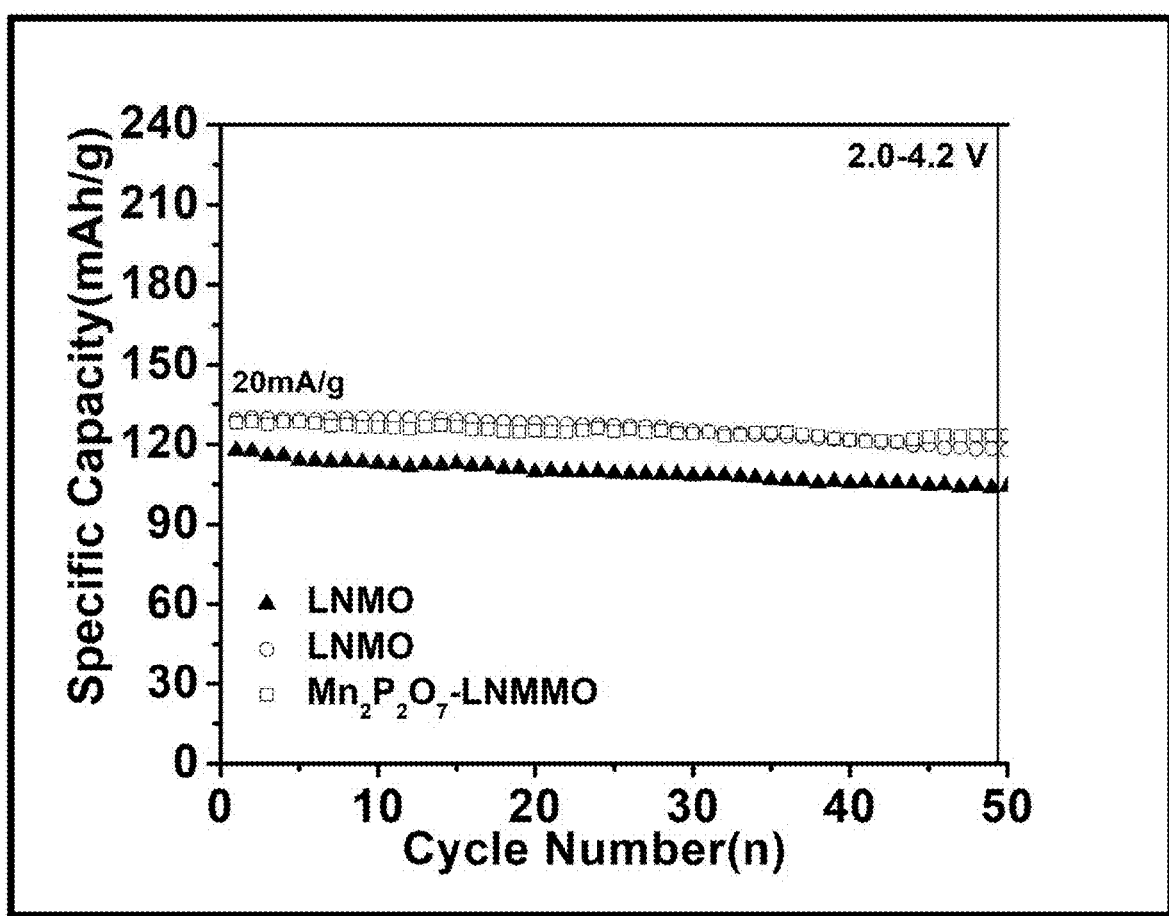
FIG. 15 is a graph of specific capacity (mAh/g) v. cycle number (n) for LNMO, LNMMO, and $Mn_2P_2O_7$ coated on a Mo doped $LiNi_{0.5}Mn_{0.5}O_2$ cathode, cycled between 2.0-4.2 V vs. $Li/Li^+$ at a specific current density 20 mA/g.

FIG. 15 is a graph of specific capacity (mAh/g) v. cycle number (n) for LNMO, LNMMO, and $Mn_2P_2O_7$ coated on Mo doped $LiNi_{0.5}Mn_{0.5}O_2$ cathode, cycled between 2.0-4.2 V vs. $Li/Li^+$ and a specific current density of 20 mA/g. The $Mn_2P_2O_7$ coated cathode shows similar performance to the Mo doped cathode at 20 mA/g between 2.0-4.2 V.

Figure 16:
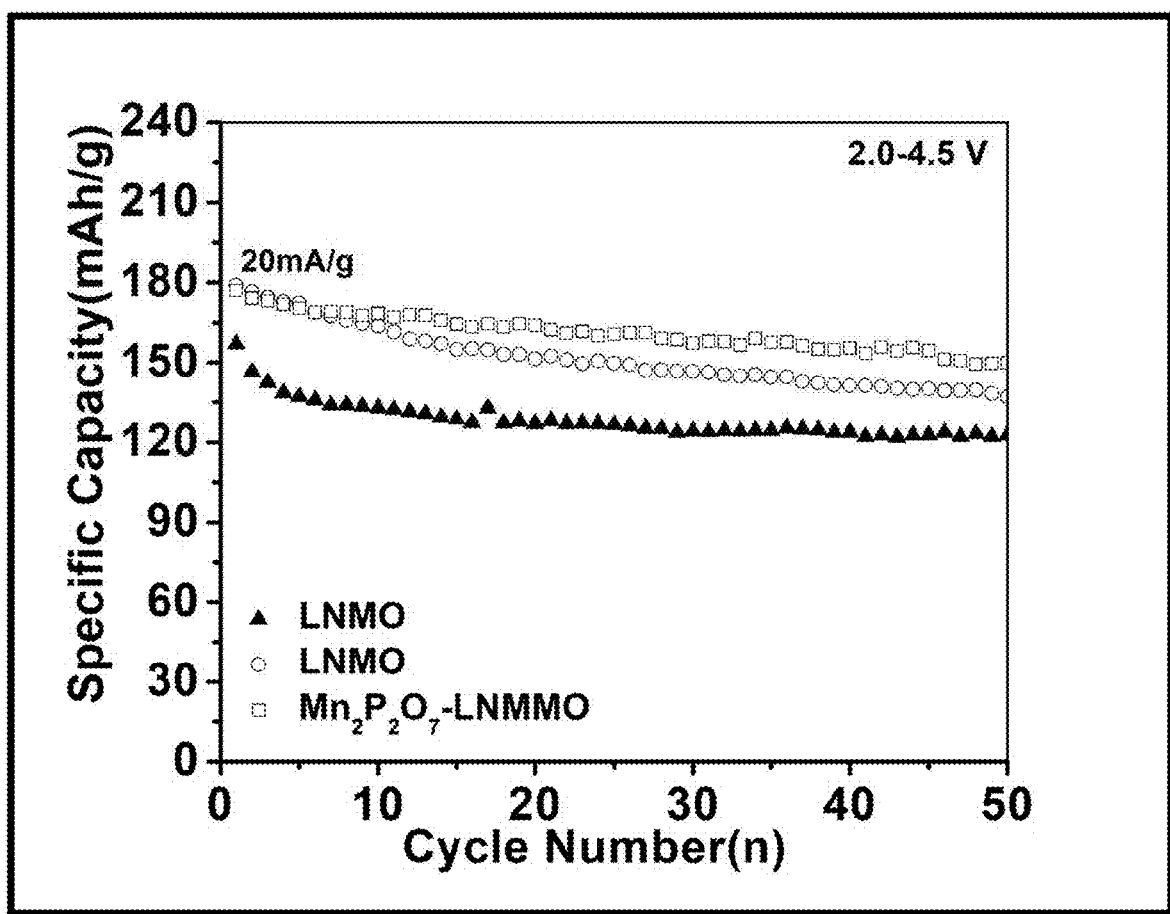
FIG. 16 is a graph of specific capacity (mAh/g) v. cycle number (n) showing electrochemical characterization for $Mn_2P_2O_7$ coated on Mo doped $LiNi_{0.5}Mn_{0.5}O_2$, cycled between 2.0-4.5 V vs. $Li/Li^+$ at a specific current density 20 mA/g.

FIG. 16 is a graph of specific capacity (mAh/g) v. cycle number (n) for $Mn_2P_2O_7$ coated on Mo doped $LiNi_{0.5}Mn_{0.5}O_2$, cycled at 2.0-4.5 V vs. $Li/Li^+$ and a specific current of 20 mA/g. The $Mn_2P_2O_7$ coated cathode shows higher specific capacity retention when cycled between 2.0-4.5 V vs. $Li/Li^+$ compared to the Mo doped cathode and baseline.

Figure 17:
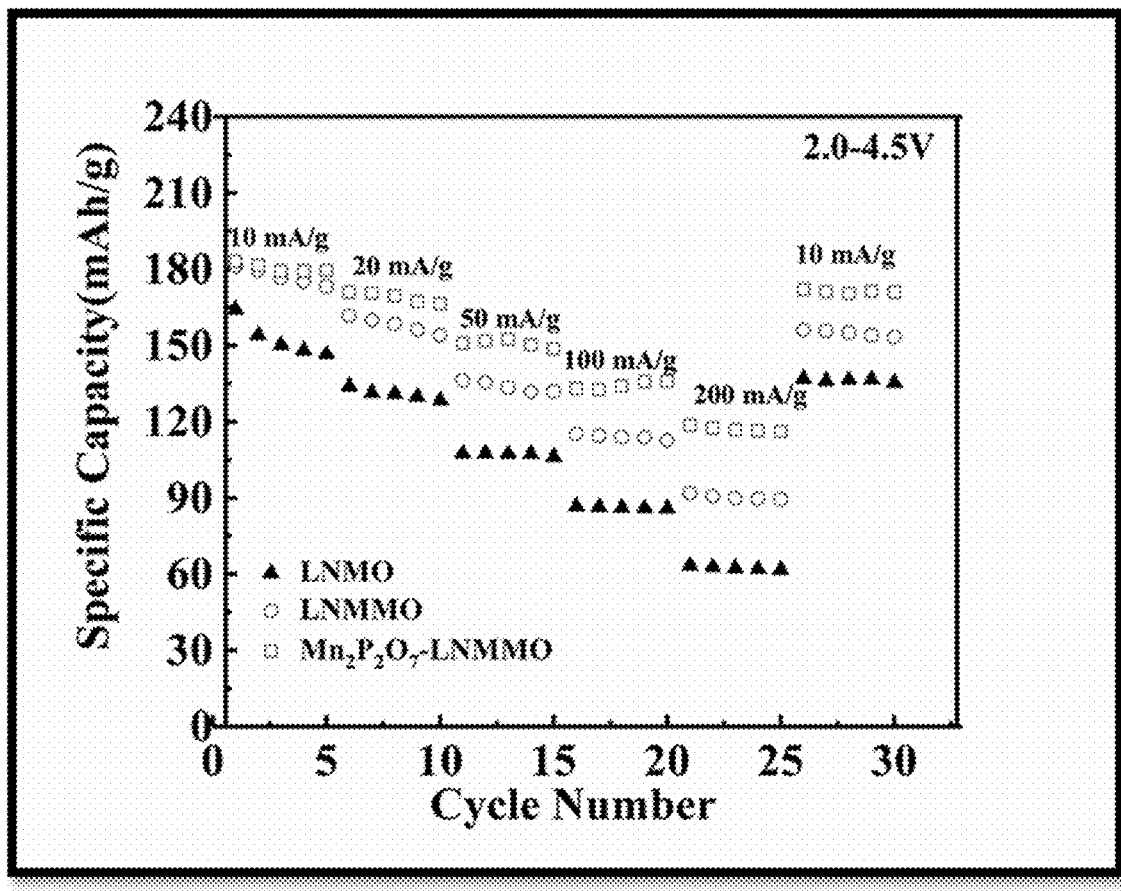
FIG. 17 is a graph of specific capacity (mAh/g) v. cycle number for LNMO, LNMMO, and $Mn_2P_2O_7$ coated on Mo doped $LiNi_{0.5}Mn_{0.5}O_2$, cycled between 2.0-4.5 V vs. $Li/Li^+$ at specific current density of 10-200 mA/g.

FIG. 17 is a graph of specific capacity (mAh/g) v. cycle number for LNMO, LNMMO, and $Mn_2P_2O_7$ coated on Mo doped $LiNi_{0.5}Mn_{0.5}O_2$, cycled between 2.0-4.5 V vs. $Li/Li^+$ and a specific current density of 10-200 mA/g. The $Mn_2P_2O_7$ coated cathode shows higher specific capacity retention when cycled between 2.0-4.5 V at specific current density of 10-200 mA/g. It shows higher performance due to the $Mn_2P_2O_7$ coating. The coating layer mitigates detrimental side reactions at the electrode/electrolyte interface. The coating layer also preserves the smooth surface of the active material upon cycling and maintain the structural integrity. The coating layer also increased structural stability due to the strong covalent phosphate bonding. The coating layer may enhance the apparent lithium ion diffusion coefficient and as a result improve de-lithiation kinetics.

Figure 18:
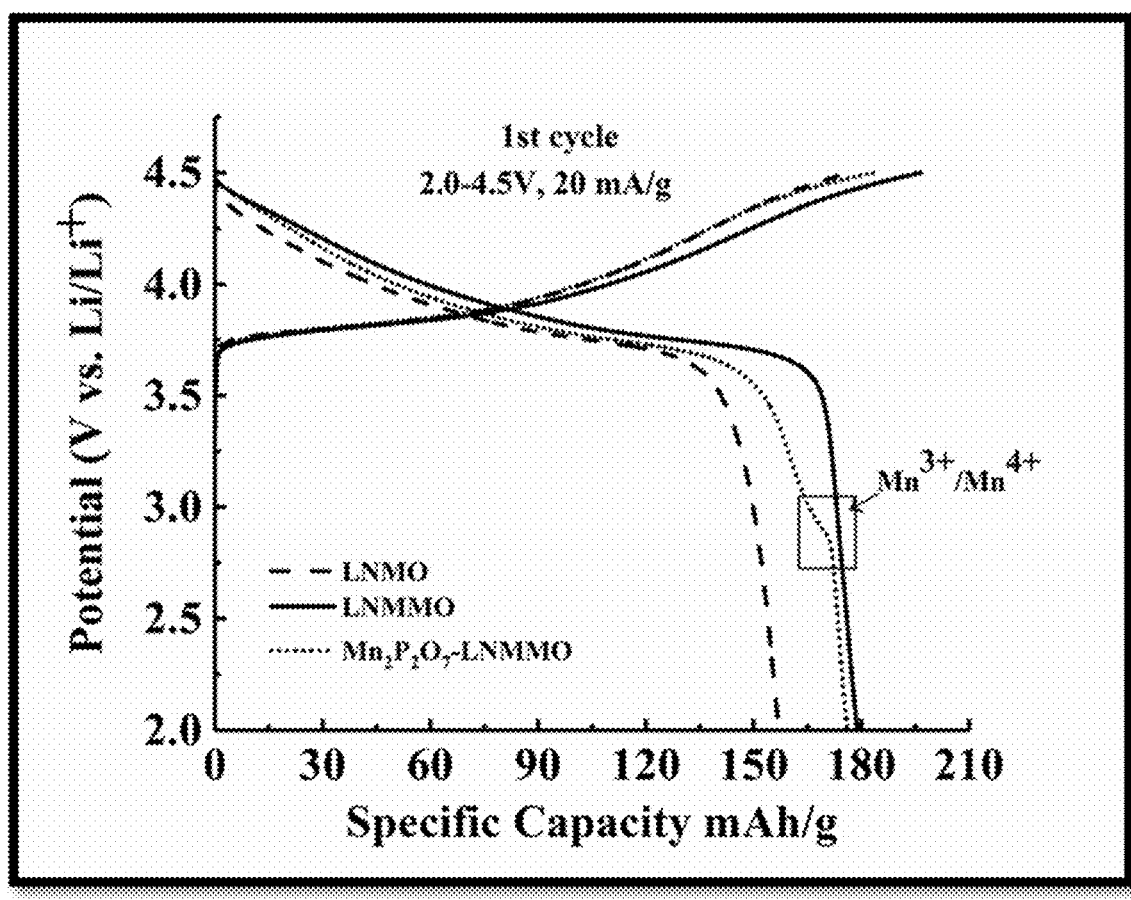
FIG. 18 is a graph of potential (V vs. $Li/Li^+$) v. specific capacity (mAh/g) for $Mn_2P_2O_7$ coated on Mo doped $LiNi_{0.5}Mn_{0.5}O_2$ collected at a specific current density of 20 mA/g.

FIG. 18 is a graph of potential (V vs. $Li/Li^+$) v. specific capacity mAh/g $Mn_2P_2O_7$ coated on Mo doped $LiNi_{0.5}Mn_{0.5}O_2$. The charge/discharge $1^{st}$ cycle at 20 mA/g between 2.0-4.5 V vs. $Li/Li^+$ is shown for the $Mn_2P_2O_7$ coated, baseline and Mo doped cathode materials. These are $LiNi_{0.5}Mn_{0.5}O_2$-LNMO, $LiNi_{0.495}Mn_{0.495}Mo_{0.01}O_2$-LNMMO, and $Mn_2P_2O_7$ coated $LiNi_{0.495}Mn_{0.495}Mo_{0.01}O_2$—$Mn_2P_2O_7$-LNMMO. The $Mn_2P_2O_7$ coating impacts the voltage profile. It shows the redox peak at about 3.0 V vs. $Li/Li^+$ due to the $Mn^{3+}/Mn^{4+}$ redox couple.

Figure 19:
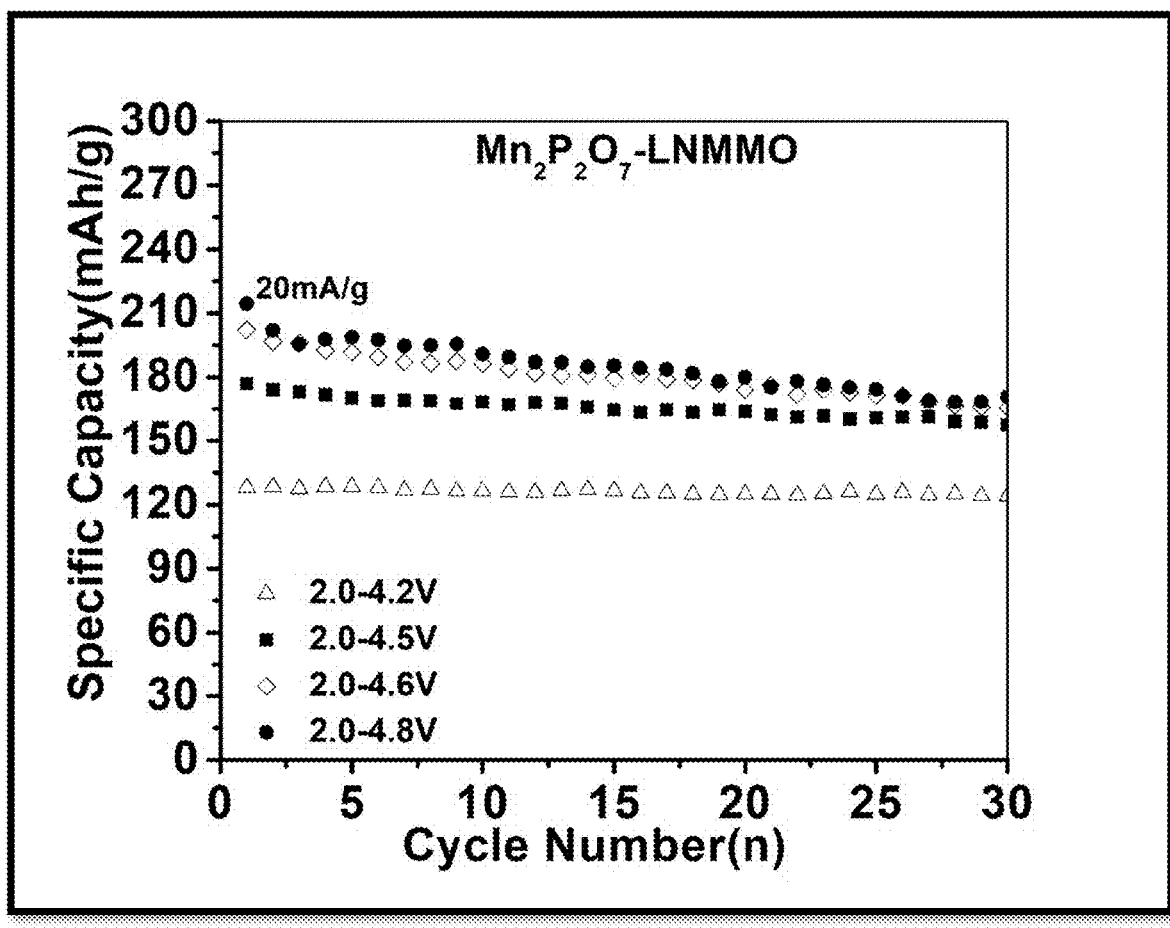
FIG. 19 is a graph of specific capacity (mAh/g) v. cycle number (n) for $Mn_2P_2O_7$ coated on Mo doped $LiNi_{0.5}Mn_{0.5}O_2$ cycled between 2.0-4.2 V, 2.0-4.5 V, 2.0-4.6 V, and 2.0-4.8 V at a specific current density of 20 mA/g.

FIG. 19 is a graph of specific capacity (mAh/g) v. cycle number (n) $Mn_2P_2O_7$ coated on Mo doped $LiNi_{0.5}Mn_{0.5}O_2$ cycled between 2.0-4.2 V, 2.0-4.5 V, 2.0-4.6 V, and 2.0-4.8 V. At higher voltage cut-offs, the electrolyte is decomposed. However, at 4.5 V the electrode shows stable electrochemical performance.

The invention is not limited in its application to the details of construction and to the arrangement of the components set forth in the foregoing description or illustrated in the drawings. The invention is capable of other embodiments and of being practiced and carried out in various ways. In addition, it is to be understood that the phraseology and terminology employed herein are for the purpose of description and should not be regarded as limiting.

It is to be understood that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A cathode for a lithium battery, comprising $LiNi_{0.5-x/2}Mn_{0.5-x/2}M_xO_2$ where M is at least one selected from the group consisting of Mo, Ti, Cr, Zr and V, and x is between 0.005 and 0.02, where M is substituted at the Ni and Mn crystallographic sites and wherein the Li:O molar ratio is 1:2 and the cation:anion molar ratio is 1:1.

2. The cathode of claim 1, wherein the $LiNi_{0.5-x/2}Mn_{0.5-x/2}M_xO_2$ is coated with lithium free $Mn_2P_2O_7$.

3. The cathode of claim 2, wherein the $Mn_2P_2O_7$ is 1-3 wt. %, based on the total weight of the $LiNi_{0.5-x/2}Mn_{0.5-x/2}M_xO_2$ and $Mn_2P_2O_7$.

4. The cathode of claim 1, wherein the $LiNi_{0.5-x/2}Mn_{0.5-x/2}M_xO_2$ is provided as particles having a diameter of from 50 to 500 nm.

5. The cathode of claim 4, wherein the $LiNi_{0.5-x/2}Mn_{0.5-x/2}M_xO_2$ is coated with $Mn_2P_2O_7$, and the $Mn_2P_2O_7$ coating is between 1 and 5 nm thick.

6. The cathode of claim 1, wherein M is Mo.

7. The cathode of claim 1, wherein the cathode is cobalt free.

8. The cathode of claim 1, wherein M is substituted at cation sites.

9. The cathode of claim 1, further comprising a conductive carbon and a binder.

10. The cathode of claim 1, wherein the usable capacity of the cathode attains 180 mAh/g when cycled to 4.5 V vs. $Li/Li^+$.

11. A cathode composition for a lithium battery, comprising $LiNi_{0.5-x/2}Mn_{0.5-x/2}M_xO_2$, where M is at least one selected from the group consisting of M=Mo, Ti, Cr, Zr and V, and x is 0.005-0.02, where M is substituted at the Ni and Mn crystallographic sites and wherein the Li:O molar ratio is 1:2 and the cation:anion molar ratio is 1:1.

12. The cathode composition of claim 11, wherein the $LiNi_{0.5-x/2}Mn_{0.5-x/2}M_xO_2$, is provided as particles, and the particles are coated with lithium free $Mn_2P_2O_7$.

13. The cathode composition of claim 12, wherein the $Mn_2P_2O_7$ coating is 1-3 wt %, based on the total weight of the $LiNi_{0.5-x/2}Mn_{0.5-x/2}M_xO_2$ and $Mn_2P_2O_7$.

14. The cathode composition of claim 12, wherein the $LiNi_{0.5-x/2}Mn_{0.5-x/2}M_xO_2$ is provided as particles having a diameter of from 50 to 500 nm.

15. The cathode composition of claim 14, wherein the $LiNi_{0.5-x/2}Mn_{0.5-x/2}M_xO_2$ is coated with $Mn_2P_2O_7$, and the $Mn_2P_2O_7$ coating is between 1 and 5 nm thick.

16. A lithium battery, comprising:
a cathode comprising $LiNi_{0.5-x/2}Mn_{0.5-x/2}M_xO_2$, where M is at least one selected from the group consisting of Mo, Ti, Cr, Zr and V, and x is 0.005 to 0.02, where M is substituted at the Ni and Mn crystallographic sites and wherein the Li:O molar ratio is 1:2 and the cation:anion molar ratio is 1:1;
an anode;
a separator; and
an electrolyte.

17. The battery of claim 16, wherein the $LiNi_{0.5-x/2}Mn_{0.5-x/2}M_xO_2$, is provided as particles, and the particles are coated with lithium free $Mn_2P_2O_7$.

18. The battery of claim 17, wherein the $Mn_2P_2O_7$ coating is 1-3 wt %, based on the total weight of the $LiNi_{0.5-x/2}Mn_{0.5-x/2}M_xO_2$ and $Mn_2P_2O_7$.

19. The battery of claim 16, wherein the $LiNi_{0.5-x/2}Mn_{0.5-x/2}M_xO_2$ is provided as particles having a diameter of from 50 to 500 nm.

20. The battery of claim 19, wherein the $LiNi_{0.5-x/2}Mn_{0.5-x/2}M_xO_2$ is coated with $Mn_2P_2O_7$, and the $Mn_2P_2O_7$ coating is between 1 and 5 nm thick.

21. The battery of claim 16, wherein the cathode is cobalt free.

22. The battery of claim 16, wherein M is substituted at cation sites.

23. The battery of claim 16, wherein the usable capacity of the cathode attains 180 mAh/g when cycled between 2.0 V vs. $Li/Li^+$ and 4.5 V vs. $Li/Li^+$ vs. $Li/Li^+$.

* * * * *